(12) United States Patent
Shimizu et al.

(10) Patent No.: US 10,880,142 B2
(45) Date of Patent: Dec. 29, 2020

(54) RADIO COMMUNICATION METHOD, RADIO TERMINAL DEVICE, AND BASE STATION DEVICE

(71) Applicant: FUJITSU LIMITED, Kawasaki (JP)

(72) Inventors: Masatsugu Shimizu, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 16/256,458

(22) Filed: Jan. 24, 2019

(65) Prior Publication Data

US 2019/0182088 A1 Jun. 13, 2019

Related U.S. Application Data

(63) Continuation of application No. PCT/JP2016/078925, filed on Sep. 29, 2016.

(30) Foreign Application Priority Data

Aug. 17, 2016 (WO) .................. PCT/JP2016/074047

(51) Int. Cl.
*H04L 27/26* (2006.01)
*H04L 1/24* (2006.01)
(Continued)

(52) U.S. Cl.
CPC ........ *H04L 27/2607* (2013.01); *H04L 1/0061* (2013.01); *H04L 1/242* (2013.01);
(Continued)

(58) Field of Classification Search
None
See application file for complete search history.

(56) References Cited

U.S. PATENT DOCUMENTS

2014/0313997 A1   10/2014   Xu et al.
2015/0036651 A1   2/2015    Takeda et al.
(Continued)

FOREIGN PATENT DOCUMENTS

JP   2013-85151 A      5/2013
WO   2014/155494 A1   10/2014
WO   2014/172515 A1   10/2014

OTHER PUBLICATIONS

3GPP TS 36.211 V13.2.0, "3rd Generation Partnership Project; Technical Specification Group Radio Access Network; Evolved Universal Terrestrial Radio Access (E-UTRA); Physical channels and modulation (Release 13)", Jun. 2016.
(Continued)

*Primary Examiner* — Ayaz R Sheikh
*Assistant Examiner* — Sori A Aga
(74) *Attorney, Agent, or Firm* — Myers Wolin, LLC

(57) ABSTRACT

A radio communication method includes: by a radio terminal device, generating position indicating signals that are different between blocks of radio resources each of which is an allocation unit of data; mapping the position indicating signals generated and transmission data to the blocks; and transmitting a signal including the blocks; by a base station device, receiving the signal including the blocks of the radio resources; evaluating continuity of the blocks, based on the position indicating signals mapped to the blocks; and demodulating data mapped to the blocks for each radio terminal device, based on an evaluation result.

9 Claims, 15 Drawing Sheets

(51) Int. Cl.
*H04L 27/38* (2006.01)
*H04L 5/00* (2006.01)
*H04L 27/01* (2006.01)
*H04L 1/00* (2006.01)
*H04W 72/00* (2009.01)

(52) U.S. Cl.
CPC .......... *H04L 5/0053* (2013.01); *H04L 5/0094* (2013.01); *H04L 27/01* (2013.01); *H04L 27/38* (2013.01); *H04W 72/00* (2013.01); *H04L 5/0007* (2013.01); *H04L 5/0048* (2013.01)

(56) References Cited

U.S. PATENT DOCUMENTS

| | | | |
|---|---|---|---|
| 2015/0092881 A1* | 4/2015 | Hwang | H04L 1/1887 375/295 |
| 2015/0381396 A1 | 12/2015 | Chen et al. | |
| 2017/0288848 A1* | 10/2017 | Lei | H04L 27/2656 |

OTHER PUBLICATIONS

3GPP TR 36.881 V14.0.0, "3rd Generation Partnership Project; Technical Specification Group Radio Access Network; Evolved Universal Terrestrial Radio Access (E-UTRA); Study on latency reduction techniques for LTE (Release 14)", Jun. 2016.
International Search Report issued by the Japan Patent Office for corresponding International Patent Application No. PCT/JP2016/078925, dated Nov. 1, 2016, with an English translation.
Written Opinion of the International Searching Authority issued for corresponding International Patent Application No. PCT/JP2016/078925, dated Nov. 1, 2016, with an English translation.

* cited by examiner

```
W(0, 8)=  1,  1,  1,  1,  1,  1,  1,  1
W(1, 8)=  1, -1,  1, -1,  1, -1,  1, -1
W(2, 8)=  1,  1, -1, -1,  1,  1, -1, -1
W(3, 8)=  1, -1, -1,  1,  1, -1, -1,  1
W(4, 8)=  1,  1,  1,  1, -1, -1, -1, -1
W(5, 8)=  1, -1,  1, -1, -1,  1, -1,  1
W(6, 8)=  1,  1, -1, -1, -1, -1,  1,  1
W(7, 8)=  1, -1, -1,  1, -1,  1,  1, -1
```

RADIO COMMUNICATION METHOD, RADIO TERMINAL DEVICE, AND BASE STATION DEVICE

CROSS-REFERENCE TO RELATED APPLICATIONS

This application is a continuation of International Application No. PCT/JP2016/078925, filed on Sep. 29, 2016 which claims the benefit of priority of the prior International Application No. PCT/JP2016/074047, filed on Aug. 17, 2016, the entire contents of which are incorporated herein by reference.

FIELD

The embodiments discussed herein are related to a radio communication method, a radio terminal device, and a base station device.

BACKGROUND

Recently, in fields of a smart meter and a sensor network, for example, introduction of machine-to-machine (M2M) communication through which machines communicate with each other without being controlled by a human has been studied. The M2M communication is called machine-type communication (MTC) by the Third Generation Partnership Project (3GPP) that is a standardization group on radio communication systems.

In the fifth generation mobile communication system the specifications of which have been started to be developed by the 3GPP, there is a possibility that many radio terminal devices will autonomously perform radio communication through massive MTC. At this time, in a method of performing radio communication in which, for example, a base station device allocates radio resources to respective radio terminal devices, overhead due to signaling before the radio terminal devices actually transmit data becomes greater. Consequently, start-up time of each radio terminal device becomes longer, and power consumption increases.

In view of this, in order to reduce signaling overhead thereby shortening the start-up time of each radio terminal device and reducing the power consumption, use of uplink contention-based access (UL CB-Access) has been studied. When the uplink contention-based access is used, although collision of data transmission performed by the radio terminal devices may occur, radio resources do not have to be allocated by the base station device, and signaling for allocating the radio resources can be omitted. Thus, for example, start-up time of each radio terminal device that starts up intermittently at predetermined report timings, for example, can be shortened, and power consumption can be reduced.

[Non-Patent Literature 1] 3GPP TS 36.211 V13.2.0 "Physical channels and modulation (Release 13)" 2016-06

[Non-Patent Literature 2] 3GPP TR 36.881 V14.0.0 "Study on latency reduction techniques for LTE (Release 14)" 2016-06

In services using MTC, contents reported by radio terminal devices differ between services, and accordingly the sizes of data transmitted by the radio terminal devices differ between services. Even if the same service is used, the sizes of data are not always constant. Thus, when uplink contention-based access is used as a transmission method in the MTC, the respective radio terminal devices transmit data in different sizes using random radio resources.

Specifically, radio resources determined in advance as radio resources to be used in MTC are shared by a plurality of radio terminal devices, and the respective radio terminal devices use random radio resources among the shared radio resources. Thus, a base station device that receives data from the radio terminal devices detects a delimiting position of data transmitted from each radio terminal device to demodulate and decode data of each radio terminal device.

However, there is the problem that efficient detection of the delimiting position of data for each radio terminal device is difficult. Specifically, while each radio terminal device assigns data to radio resources in a unit of resource blocks, for example, to transmit the data, the size of data is not constant, and accordingly the number of resource blocks used for the radio terminal device to transmit the data is not constant either. Thus, many candidates exist that can be the delimiting position of data of each radio terminal device, which makes it difficult for the base station device to uniquely determine the delimiting position of the data.

As a method for determining the delimiting position, for example, the respective candidates may be assumed as the delimiting position, data of each radio terminal device may be demodulated and decoded, and then whether data without errors can be obtained may be checked. However, because many candidates exist as the delimiting position as described above, the number of combinations of delimiting positions for the respective radio terminal devices becomes significantly large, and thus performing demodulation and decoding of data for all combinations is inefficient.

SUMMARY

According to an aspect of an embodiment, a radio communication method is used in a radio communication system including a radio terminal device and a base station device. The method includes: by the radio terminal device, generating position indicating signals that are different between blocks of radio resources each of which is an allocation unit of data; mapping the position indicating signals generated and transmission data to the blocks; and transmitting a signal including the blocks; by the base station device, receiving the signal including the blocks of the radio resources; evaluating continuity of the blocks, based on the position indicating signals mapped to the blocks; and demodulating data mapped to the blocks for each radio terminal device, based on an evaluation result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the present invention is not limited to these embodiments.

[a] First Embodiment

Figure 1:
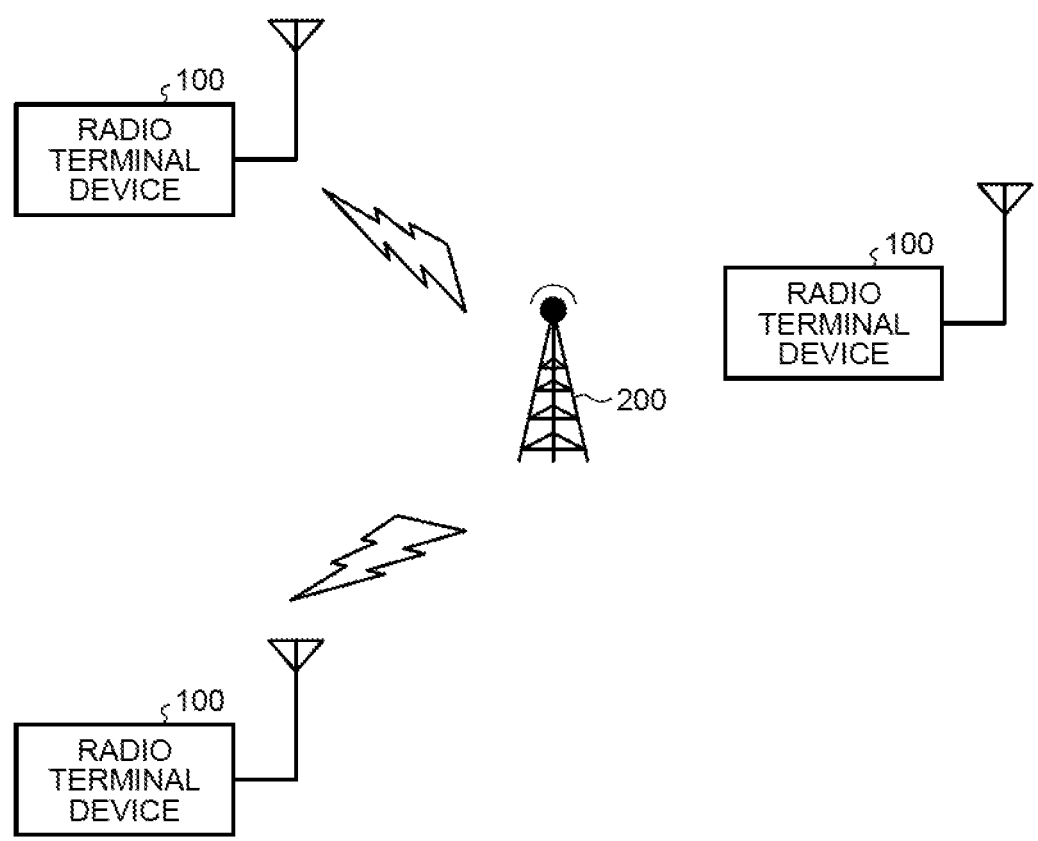
FIG. 1 is a diagram illustrating a configuration of a radio communication system according to a first embodiment.

FIG. 1 is a diagram illustrating a configuration of the radio communication system according to the first embodiment. The radio communication system depicted in FIG. 1 includes a plurality of radio terminal devices 100 and a base station device 200.

Each radio terminal device 100 uses uplink contention-based access to transmit data to the base station device 200. In other words, the radio terminal devices 100 share radio resources for transmitting data to the base station device 200, and each radio terminal device 100, when data needed to be transmitted is generated, uses a radio resource corresponding to the data size among the shared radio resources to transmit the data.

At this time, the radio terminal device 100 maps the data to the radio resource, for example, using blocks each having a predetermined frequency bandwidth as a unit, and transmits the data to the base station device 200. The radio terminal device 100 also maps position indicating signals indicating delimiting positions of the data of the radio terminal device to the blocks to which the data is mapped, and transmits the signals together with the data. Specifically, the radio terminal device 100 maps signals that are cyclically repeated in size different from the size of each block of the radio resources, as the position indicating signals, to the blocks containing the data of the radio terminal device.

As the position indicating signals, for example, signals into which a Zadoff-Chu sequence having a sequence length of a prime number equal to or smaller than the size of each block is cyclically extended can be used. Specifically, for example, when the size of the block corresponds to 12 subcarriers, signals obtained by cyclically extending a Zadoff-Chu sequence having a sequence length of 11 as a prime number equal to or smaller than 12 can be used as the position indicating signals. Herein, the sequence length of a sequence used for the position indicating signals does not necessarily have to be a prime number. However, when the position indicating signals are generated by cyclically extending a signal sequence, it is preferable to use a sequence length with which the least common multiple of the size of the block and the sequence length can be made larger. If a signal sequence with which mutually orthogonal signals can be obtained by shifting it is used, a signal obtained by shifting the signal sequence the size of which is the same as the size of the block in different pattern for each block may be used as a position indicating signal for the block.

The base station device 200 uses uplink contention-based access to receive data transmitted from the radio terminal devices 100. Using a position indicating signal contained in each block of received signals, the base station device 200 detects delimiting positions of data transmitted from the respective radio terminal devices 100, and demodulates and decodes the data for each radio terminal device 100.

In detecting the delimiting positions of data, the base station device 200, while shifting a replica of the position indicating signal, detects correlation between the replica and each block of the received signals to determine whether the correlation value is equal to or larger than a predetermined threshold. Because position indicating signals are generated by cyclically extending a Zadoff-Chu sequence having strong autocorrelation, if the correlation value between a certain block and the replica is equal to or larger than the predetermined threshold, the ordinal number of this block in blocks containing data transmitted from one radio terminal device 100 can be identified based on the shift amount of the replica. Furthermore, when a position indicating signal is generated by shifting a predetermined sequence in different pattern for each block, the ordinal number of that block in the blocks can be identified based on the correlation value between the block and the replica of the position indicating signal.

Figure 2:
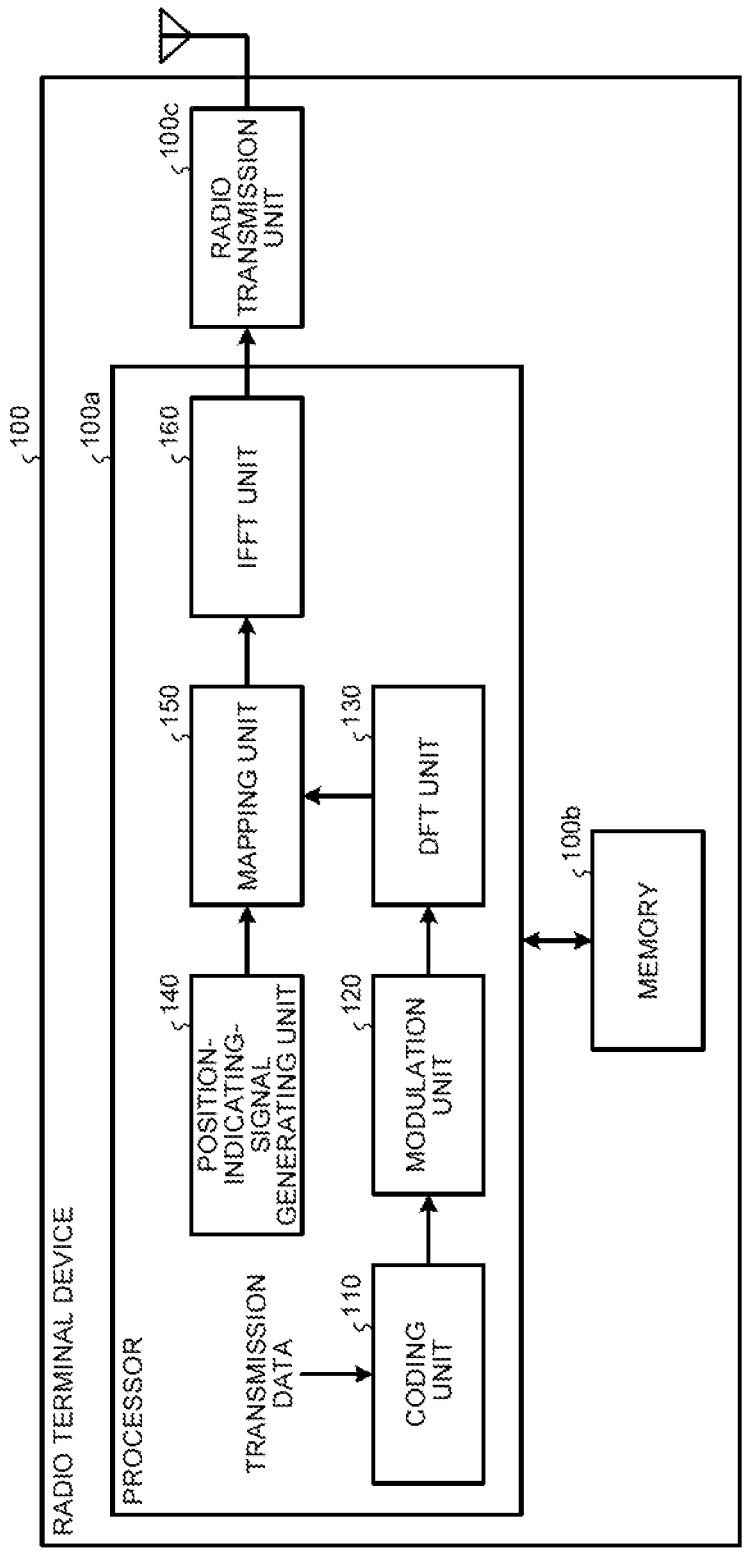
FIG. 2 is a block diagram illustrating a configuration of a radio terminal device according to the first embodiment.

FIG. 2 is a block diagram illustrating a configuration of each radio terminal device 100 according to the first embodiment. The radio terminal device 100 indicated in FIG. 2 includes a processor 100a, a memory 100b, and a radio transmission unit 100c.

The processor 100a is provided with, for example, a central processing unit (CPU), a field programmable gate array (FPGA), or a digital signal processor (DSP), and controls the entire radio terminal device 100 in a centralized manner. Specifically, the processor 100a includes a coding unit 110, a modulation unit 120, a discrete Fourier transform (DFT) unit 130, a position-indicating-signal generating unit 140, a mapping unit 150, and an inverse fast Fourier transform (IFFT) unit 160.

The coding unit 110 adds a cyclic redundancy check (CRC) that is an error-detecting code to transmission data to error-correction-code the transmission data. The coding unit 110 outputs the error-correction-coded transmission data to the modulation unit 120.

The modulation unit 120 modulates the transmission data output from the coding unit 110, and outputs the modulated transmission data to the DFT unit 130.

The DFT unit 130 discrete-Fourier-transforms the transmission data output from the modulation unit 120 to transform it into frequency-domain data. The DFT unit 130 then outputs the frequency-domain data to the mapping unit 150.

The position-indicating-signal generating unit 140 generates position indicating signals that indicate delimiting positions of data of each radio terminal device 100. Specifically, the position-indicating-signal generating unit 140 generates the position indicating signals by cyclically extending a signal sequence having a sequence length smaller than the size of a block that is a smallest unit of radio resources to which the transmission data is mapped. More specifically, the position-indicating-signal generating unit 140 generates position indicating signals by repeating a Zadoff-Chu sequence the sequence length of which is smaller than the size of the block, for example.

Here, the m-th ($0 \leq m \leq N_{ZC}-1$) signal $x_q(m)$ in a Zadoff-Chu sequence having a sequence length of $N_{ZC}$ can be expressed by Formula (1):

$$x_q(m) = e^{-j\pi qm(m+1)/N_{ZC}} \quad (1)$$

In Formula (1), q is a value with which the sequence type of the Zadoff-Chu sequence is identified. The position-indicating-signal generating unit 140 generates position indicating signals using signals of Formula (1). When the size of transmission data is M (M>0), the k-th ($0 \leq k < M$) signal r(k) of the position indicating signals can be expressed by Formula (2):

$$r(k) = x_q(k \bmod N_{ZC}) \quad (2)$$

In Formula (2), (k mod $N_{ZC}$) represents a remainder when k is divided by the sequence length $N_{ZC}$. Thus, the position indicating signal r(k) is a signal obtained by repeating the same signal sequence using the sequence length $N_{ZC}$ as its cycle.

The sequence length $N_{ZC}$ of a signal sequence used when the position indicating signals are generated is smaller than the size of a block that is the smallest unit of radio resources to which the transmission data is mapped. The sequence length $N_{ZC}$ is preferably a prime number. By using a prime number for the sequence length $N_{ZC}$, the least common multiple of the size of the block and the sequence length $N_{ZC}$ can be made larger. Consequently, when position indicating signals obtained by cyclically extending a signal sequence are mapped to a plurality of consecutive blocks, the number of blocks to which different position indicating signals are mapped can be increased. In other words, the number of blocks that can be distinguished with the position indicating signals can be increased.

Figure 3:
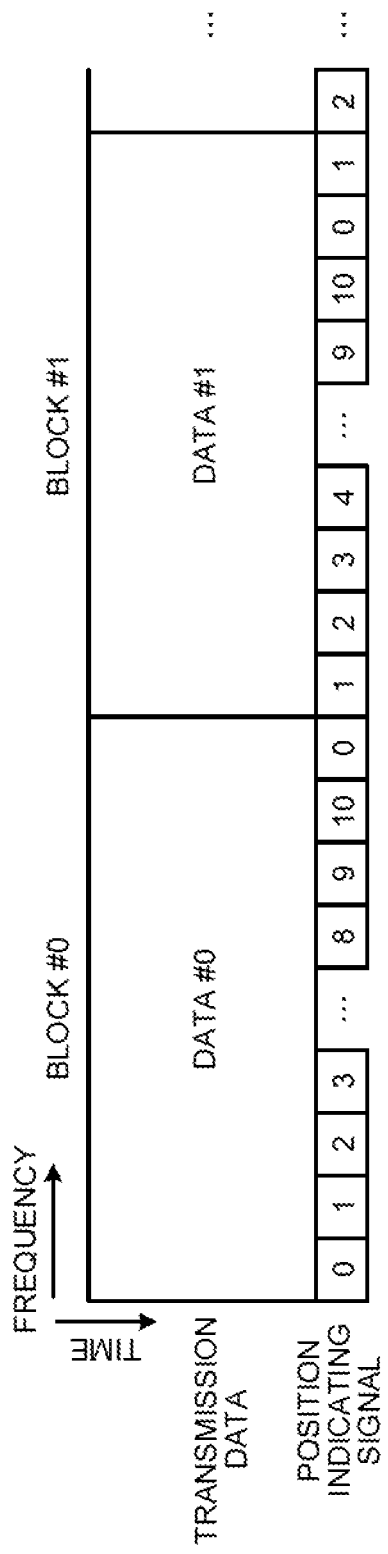
FIG. 3 is a diagram illustrating one example of mapping performed by the radio terminal device.

The mapping unit 150 maps pieces of the frequency-domain data output from the DFT unit 130 and the position indicating signals generated by the position-indicating-signal generating unit 140 to radio resources. Specifically, the mapping unit 150 maps the pieces of data and the position indicating signals to blocks that are units of radio resources each specified by a predetermined frequency band and time. At this time, as depicted in FIG. 3, for example, to the blocks to which the pieces of data are mapped, the mapping unit 150 also maps the position indicating signals. Specifically, when data #0 is mapped to a block #0, a position indicating signal is also mapped to this block #0, and when data #1 is mapped to a block #1 adjacent to the block #0, a position indicating signal is also mapped to this block #1.

When position indicating signals are generated by cyclically extending a signal sequence having a sequence length smaller than the size of each block, the position indicating signals contained in the respective blocks are different from each other as depicted in FIG. 3. Specifically, for example, the position indicating signal in the block #0 is a signal into which an original signal sequence is cyclically extended to the size of the block with the beginning ("0" in FIG. 3) of the original signal sequence used as a starting point. By contrast, the position indicating signal in the block #1 is a signal into which the original signal sequence is cyclically extended to the size of the block with the second signal ("1" in FIG. 3) in the original signal sequence used as a starting point. In other words, the position indicating signals in the respective blocks are generated by cyclically extending the original signal sequence using, as a starting point, a position that is different for each block, and the starting points for cyclic extension in the consecutive blocks have predetermined regularity. Hereinafter, the shift amount at the starting point in cyclic extension for each block is called "cyclic shift". Specifically, for example, in FIG. 3, the cyclic shift of the position indicating signal in the block #0 is 0, and the cyclic shift of the position indicating signal in the block #1 is 1.

In this manner, the cyclic shifts of the position indicating signals differ between blocks, and thus the blocks #0 and #1 that are consecutive in the frequency direction can be distinguished with the position indicating signals, and also the ordinal number of each block in the blocks can be identified based on the cyclic shift of the position indicating signal in the block. In other words, based on the cyclic shifts of the position indicating signals in the respective blocks, continuity of blocks can be evaluated.

Furthermore, when position indicating signals are generated with a Zadoff-Chu sequence, the position indicating signals mapped to the respective blocks are orthogonal to each other. Thus, even in a case in which data transmitted from another radio terminal device 100 is contained in the same block, if the block from which data starts differs between the radio terminal devices 100, the delimiting positions of transmission data from each radio terminal device 100 can be accurately detected.

Referring back to FIG. 2, the IFFT unit 160 inverse-fast-Fourier-transforms transmitted signals obtained by the mapping unit 150 to generate time-domain transmitted signals. The IFFT unit 160 then outputs the transmitted signals to the radio transmission unit 100*c*.

The memory 100*b* is provided with, for example, a random access memory (RAM) or a read only memory (ROM), and stores various types of information when processes are performed by the processor 100*a*.

The radio transmission unit 100*c* performs radio transmission processes such as digital/analog (D/A) conversion and upconversion on transmitted signals output from the IFFT unit 160. The radio transmission unit 100*c* then transmits the transmitted signals via an antenna.

Figure 4:
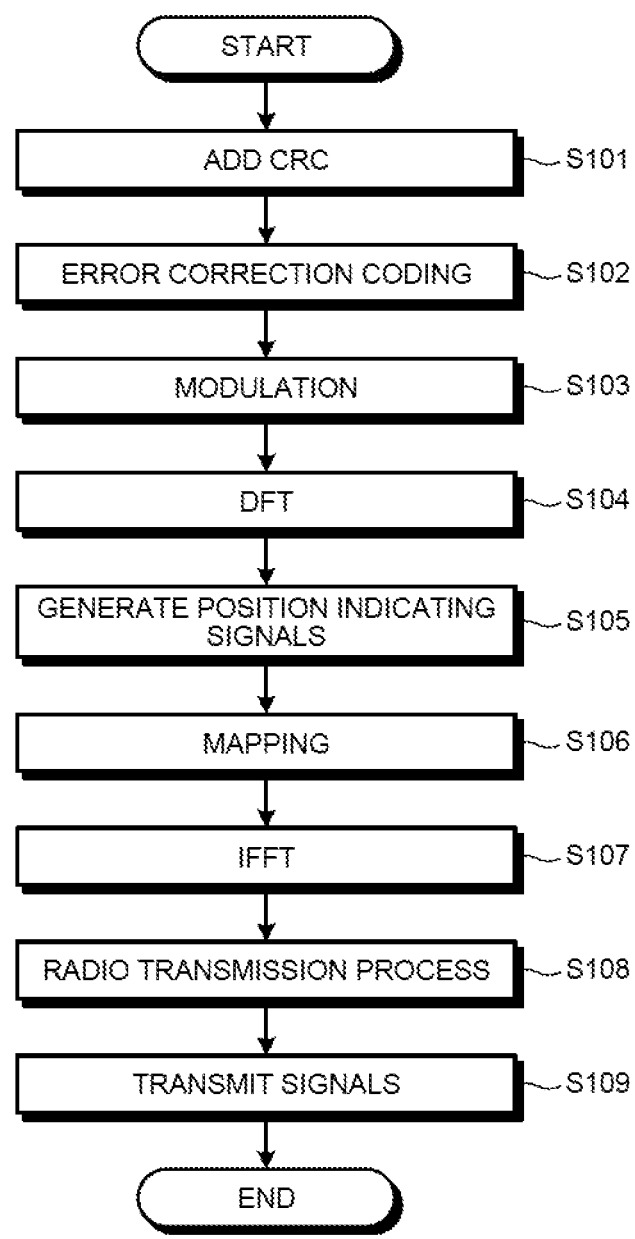
FIG. 4 is a flowchart illustrating a radio transmission method according to the first embodiment.

The following describes radio transmission processes performed by each radio terminal device 100 configured as described above with reference to the flowchart depicted in FIG. 4.

When transmission data to be transmitted is generated in the radio terminal device 100, the coding unit 110 adds a CRC to the transmission data (step S101), and performs error correction coding on the transmission data (step S102). The error-correction-coded transmission data is modulated by the modulation unit 120 (step S103), and is discrete-Fourier-transformed by the DFT unit 130 (step S104). By this discrete Fourier transform, the transmission data is transformed into frequency-domain data.

Meanwhile, the position-indicating-signal generating unit 140 cyclically extends a signal sequence such as a Zadoff-Chu sequence, thereby generating position indicating signals (step S105). The sequence length of the original signal sequence to be cyclically extended is equal to or smaller than the size of each block of radio resources that is a unit of mapping in the mapping unit 150. Specifically, for example, when the frequency bandwidth of the block corresponds to the size for 12 subcarriers, the sequence length of the original signal sequence is equal to or smaller than 12. In this case, the original signal sequence is cyclically extended with a position different for each block used as a starting point, whereby position indicating signals the cyclic shifts of which differ between blocks are generated. The original signal sequence used for generating the position indicating signals may be specified by the base station device 200, for example, and a plurality of radio terminal devices 100 may generate the position indicating signals using the same signal sequence.

When frequency-domain data and position indicating signals have been generated, the mapping unit 150 maps the data and the position indicating signals to radio resources (step S106). Specifically, the data is mapped to blocks of the radio resources, and also the position indicating signals are mapped to the blocks to which the data is mapped. Transmitted signals generated by this mapping are inverse-fast-Fourier-transformed by the IFFT unit 160 (step S107) into time-domain transmitted signals. The transmitted signals are then subjected to a predetermined radio transmission process by the radio transmission unit 100c (step S108) to be transmitted to the base station device 200 via the antenna (step S109).

Figure 5:
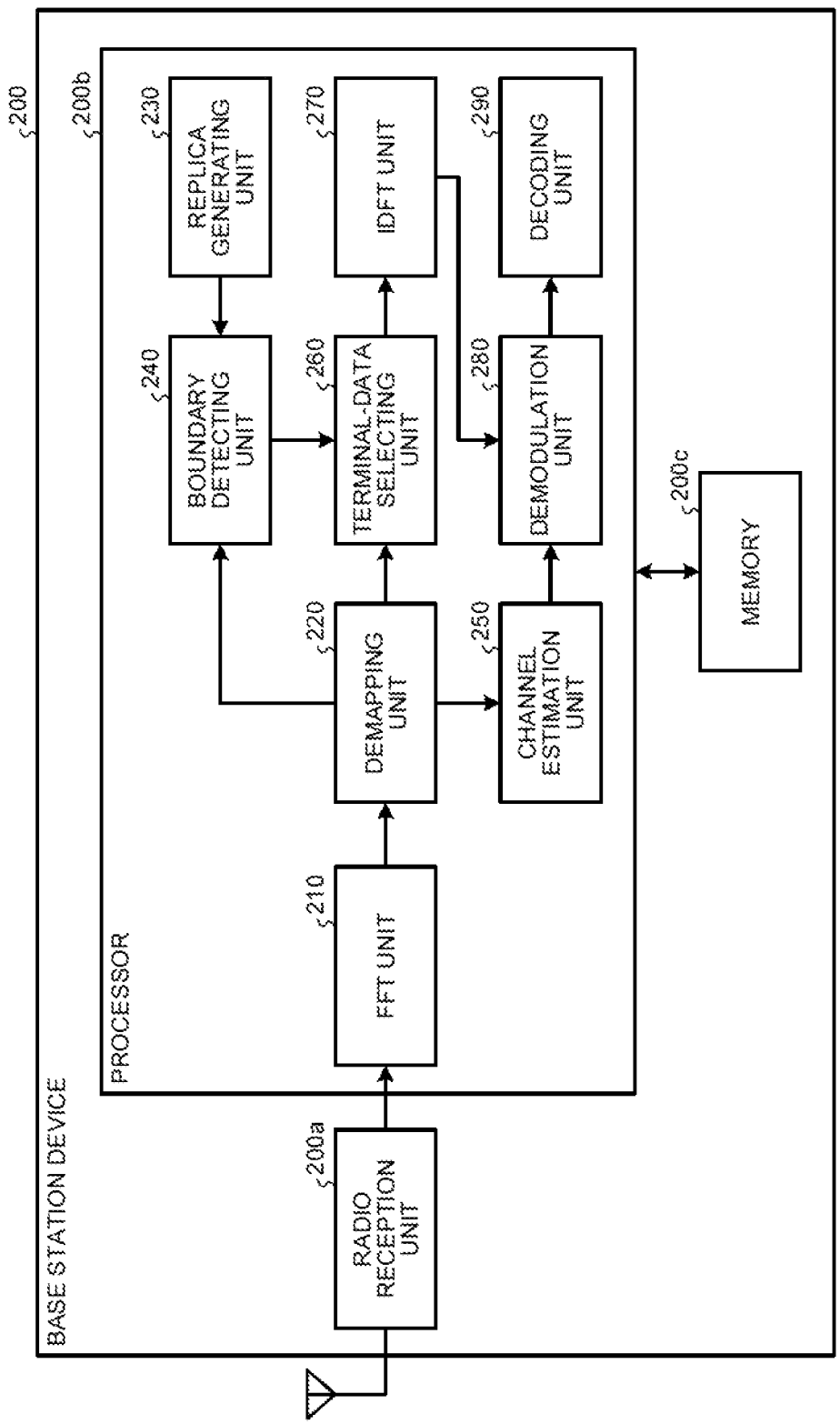
FIG. 5 is a block diagram illustrating a configuration of a base station device according to the first embodiment.

The following describes a configuration and operation of the base station device 200. FIG. 5 is a block diagram illustrating the configuration of the base station device 200 according to the first embodiment. The base station device 200 depicted in FIG. 5 includes a radio reception unit 200a, a processor 200b, and a memory 200c.

The radio reception unit 200a receives signals via an antenna, and performs radio reception processes such as downconversion and analog/digital (A/D) conversion on the received signals. The radio reception unit 200a then outputs the received signals to the processor 200b.

The processor 200b is provided with, for example, a CPU, an FPGA, or a DSP, and controls the entire base station device 200 in a centralized manner. Specifically, the processor 200b includes a fast Fourier transform (FFT) unit 210, a demapping unit 220, a replica generating unit 230, a boundary detecting unit 240, a channel estimation unit 250, a terminal-data selecting unit 260, an inverse discrete Fourier transform (IDFT) unit 270, a demodulation unit 280, and a decoding unit 290.

The FFT unit 210 fast-Fourier-transforms received signals output from the radio reception unit 200a to generate frequency-domain received signals. The FFT unit 210 then outputs the received signals to the demapping unit 220.

The demapping unit 220 demaps radio resources included in the received signals, and acquires signals included in the received signals. Specifically, the demapping unit 220 acquires data, position indicating signals, and pilot signals for each block included in the received signals. The demapping unit 220 then outputs the data to the terminal-data selecting unit 260, outputs the position indicating signals to the boundary detecting unit 240, and outputs the pilot signals to the channel estimation unit 250. Herein, the pilot signals are known signals that are transmitted for channel estimation by each radio terminal device 100. However, in the present embodiment, the position indicating signals may be used as pilot signals.

The replica generating unit 230 generates replicas of the position indicating signals. Specifically, the replica generating unit 230 generates a replica the size of which is the same as the size of each block, using a signal sequence that is the same as the signal sequence used when the radio terminal device 100 generates the position indicating signals. Because the sequence length of the signal sequence is smaller than the size of the block, the replica generating unit 230 generates the replica the size of which is the same as that of the block by cyclically extending the original signal sequence.

At this time, the replica generating unit 230 generates the replicas while shifting the starting point in response to instructions from the boundary detecting unit 240. Specifically, the replica generating unit 230 generates an initial replica obtained by cyclically extending the original signal sequence using the beginning thereof as a starting point, and also generates replicas by cyclically extending the original signal sequence using, as a starting point, a position that is shifted from the beginning.

Based on the position indicating signals in the respective blocks acquired by the demapping unit 220 and the replicas generated by the replica generating unit 230, the boundary detecting unit 240 detects delimiting positions of a series of data transmitted from each radio terminal device 100 (hereinafter called "terminal data").

Specifically, while causing the replica generating unit 230 to successively generate replicas each having a different shift amount at its starting point, the boundary detecting unit 240 detects correlation between the position indicating signal in each block and the replica. If the correlation value between the position indicating signal in a certain block and the replica is equal to or larger than a predetermined threshold, the boundary detecting unit 240 determines that the terminal data is contained in this block. Furthermore, the boundary detecting unit 240 detects correlation between a replica the shift amount of which at its starting point has been changed and the position indicating signal in the adjacent block to determine whether the terminal data transmitted from the same radio terminal device 100 is contained also in the adjacent block. The boundary detecting unit 240 then determines that a series of terminal data is contained in the consecutive blocks for which the correlation value between the position indicating signals and the replica is equal to or larger than the predetermined threshold.

In this manner, the boundary detecting unit 240 determines that terminal data is contained in sections where the correlation value between the position indicating signals and the replica is equal to or larger than the predetermined threshold, thereby evaluating the continuity of the blocks to detect delimiting positions of terminal data for each radio terminal device 100. Specifically, in the case of consecutive blocks, the position indicating signals have predetermined regularity among the blocks, and thus the boundary detecting unit 240 evaluates the continuity of the blocks using a replica the starting point of which is shifted based on this regularity.

The channel estimation unit 250 performs channel estimation using a pilot signal contained in the consecutive blocks corresponding to the terminal data. In other words, the channel estimation unit 250 performs channel estimation on data for each radio terminal device 100. At this time, the channel estimation unit 250 may use position indicating signals as pilot signals to perform channel estimation.

Using the delimiting positions of terminal data detected by the boundary detecting unit 240, the terminal-data selecting unit 260 selects each piece of terminal data from pieces of data output from the demapping unit 220. Specifically, from consecutive blocks containing terminal data of the same radio terminal device 100, the terminal-data selecting unit 260 extracts the terminal data, and outputs the data to the IDFT unit 270.

The IDFT unit 270 inverse-discrete-Fourier-transforms the terminal data output from the terminal-data selecting unit 260 into time-domain data. The IDFT unit 270 then outputs the time-domain data to the demodulation unit 280.

The demodulation unit 280 demodulates the data output from the IDFT unit 270, using channel estimation values obtained as results of channel estimation performed by the channel estimation unit 250. The demodulation unit 280 then outputs the demodulated data to the decoding unit 290.

The decoding unit 290 error-correction-decodes the data output from the demodulation unit 280 to perform error detection using the CRC.

Figure 6:
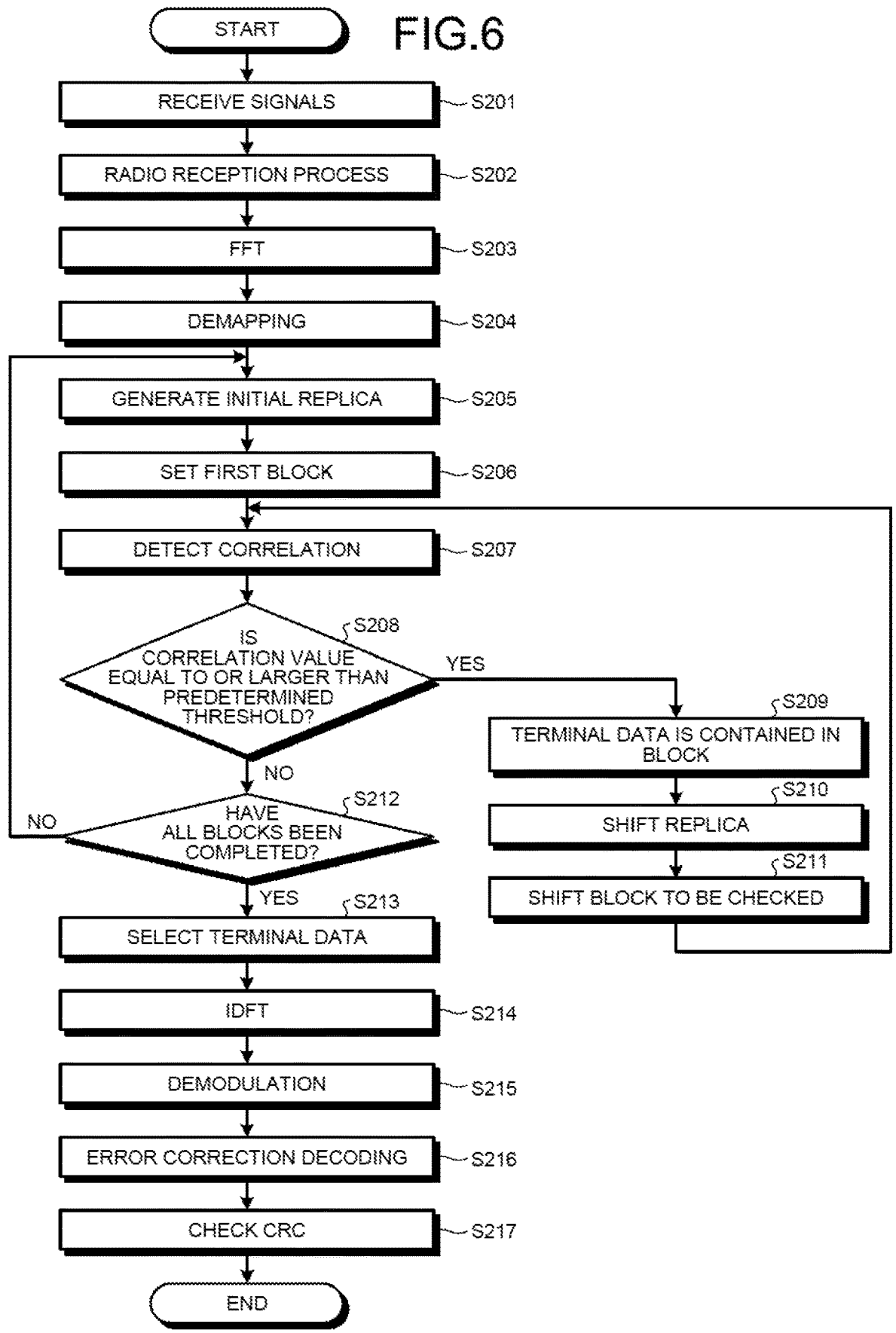
FIG. 6 is a flowchart illustrating a radio reception method according to the first embodiment.

The following describes radio reception processes performed by the base station device 200 configured as described above with reference to the flowchart depicted in FIG. 6.

Signals transmitted from each radio terminal device 100 are received by the radio reception unit 200a via the antenna (step S201). Herein, because the radio terminal device 100 transmits signals by uplink contention-based access, the received signals may include signals transmitted from a plurality of radio terminal devices 100.

The received signals are subjected to a predetermined radio reception process by the radio reception unit 200a (step S202), and is fast-Fourier-transformed by the FFT unit 210 (step S203), thereby being transformed into frequency-domain signals. The received signals are demapped by the demapping unit 220 (step S204), whereby signals contained in blocks of radio resources are acquired. Specifically, pieces of data, position indicating signals, and pilot signals for the respective blocks are acquired, the pieces of data are output to the terminal-data selecting unit 260, the position indicating signals are output to the boundary detecting unit 240, and the pilot signals are output to the channel estimation unit 250. Herein, the position indicating signals may be output as pilot signals to the channel estimation unit 250.

Meanwhile, the replica generating unit 230 generates replicas of the position indicating signals from a signal sequence used when the radio terminal device 100 generates the position indicating signals. Here, an initial replica obtained by cyclically extending an original signal sequence using the beginning thereof as a starting point is generated (step S205). In other words, a replica the shift amount of which at the starting point is 0 is generated as an initial replica. Subsequently, the boundary detecting unit 240 sets, out of a plurality of blocks included in the received signals, a first block in which a delimiting position of data is to be detected (step S206). Here, for example, a block corresponding to a lowest frequency band out of frequency bands of the received signals is set as the first block.

Subsequently, the boundary detecting unit 240 detects correlation between the position indicating signal in the first block and the initial replica (step S207) to determine whether the correlation value is equal to or larger than the predetermined threshold (step S208). As a result of this determination, if the correlation value is equal to or larger than the predetermined threshold (Yes at step S208), the boundary detecting unit 240 determines that terminal data starting from the set first block exists (step S209). Specifically, because a position indicating signal having a larger correlation value with the initial replica the shift amount of which at the starting point is 0 is contained in the first block, it is determined that terminal data starting from this block exists.

When a block from which terminal data starts has been detected, the replica generating unit 230 that has received instructions from the boundary detecting unit 240 generates a replica the shift amount of which at the starting point is changed (step S210). Specifically, a replica the starting point of which has been shifted by a shift amount corresponding to a block adjacent to the block in which the correlation with the replica has just been detected is generated. Thus, herein, a replica having a shift amount corresponding to the second block adjacent to the first block is generated.

A target block the correlation of which is to be detected is also shifted to a block adjacent to the first block (step S211), and the boundary detecting unit 240 detects the correlation between the position indicating signal in this new target block and the replica (step S207). As a result of this correlation detection, if the correlation value for the new target block is equal to or larger than the predetermined threshold (Yes at step S208), it is determined that the terminal data continues to be contained in the new target block (step S209). Subsequently, the replica and the target block are further shifted (steps S210 and S211), and correlation detection between the position indicating signal in the target block and the replica is repeated.

If the correlation value between the position indicating signal in the first block and the initial replica is smaller than the predetermined threshold (No at step S208), it is determined that the terminal data is not contained in the first block. After it has been determined that terminal data starting from the first block exists, if the correlation value between the position indicating signal in any target block and the replica is smaller than the predetermined threshold (No at step S208), it is determined that the terminal data starting from the first block ends. In other words, as a result of evaluating continuity of blocks, delimiting positions of consecutive pieces of terminal data have been detected by the boundary detecting unit 240.

Subsequently, the boundary detecting unit 240 determines whether all blocks included in the received signals have been set each as the first block (step S212). As a result of this determination, if a block that has not been set as the first block remains (No at step S212), an initial replica is generated again (step S205), and a first block is newly set (step S206). In the same manner as in the processes described above, whether terminal data starting from the first block thus newly set exists is determined, and if the terminal data exists, delimiting positions of this terminal data are detected. As described above, by correlation detection using a replica the shift amount of which at its starting point is different for each block, continuity of terminal data between blocks is evaluated, whereby delimiting positions of terminal data transmitted from each of the radio terminal devices 100 can be efficiently detected.

When all blocks included in the received signals have been set as the first block (Yes at step S212), delimiting positions of all pieces of terminal data included in the received signals have been detected. Thus, the terminal-data selecting unit 260 successively selects the respective pieces of terminal data from pieces of data included in the received signals (step S213). Each selected piece of terminal data is inverse-discrete-Fourier-transformed into time-domain data by the IDFT unit 270 (step S214).

The channel estimation unit 250 performs channel estimation using pilot signals corresponding to the respective pieces of terminal data. In this channel estimation, position indicating signals corresponding to the respective pieces of terminal data may be used. With channel estimation values obtained as a result of the channel estimation, the pieces of terminal data are demodulated by the demodulation unit 280 (step S215). By the decoding unit 290, the demodulated pieces of terminal data are error-correction-decoded (step S216), and are subjected to error detection using the CRC (step S217).

Figure 7:
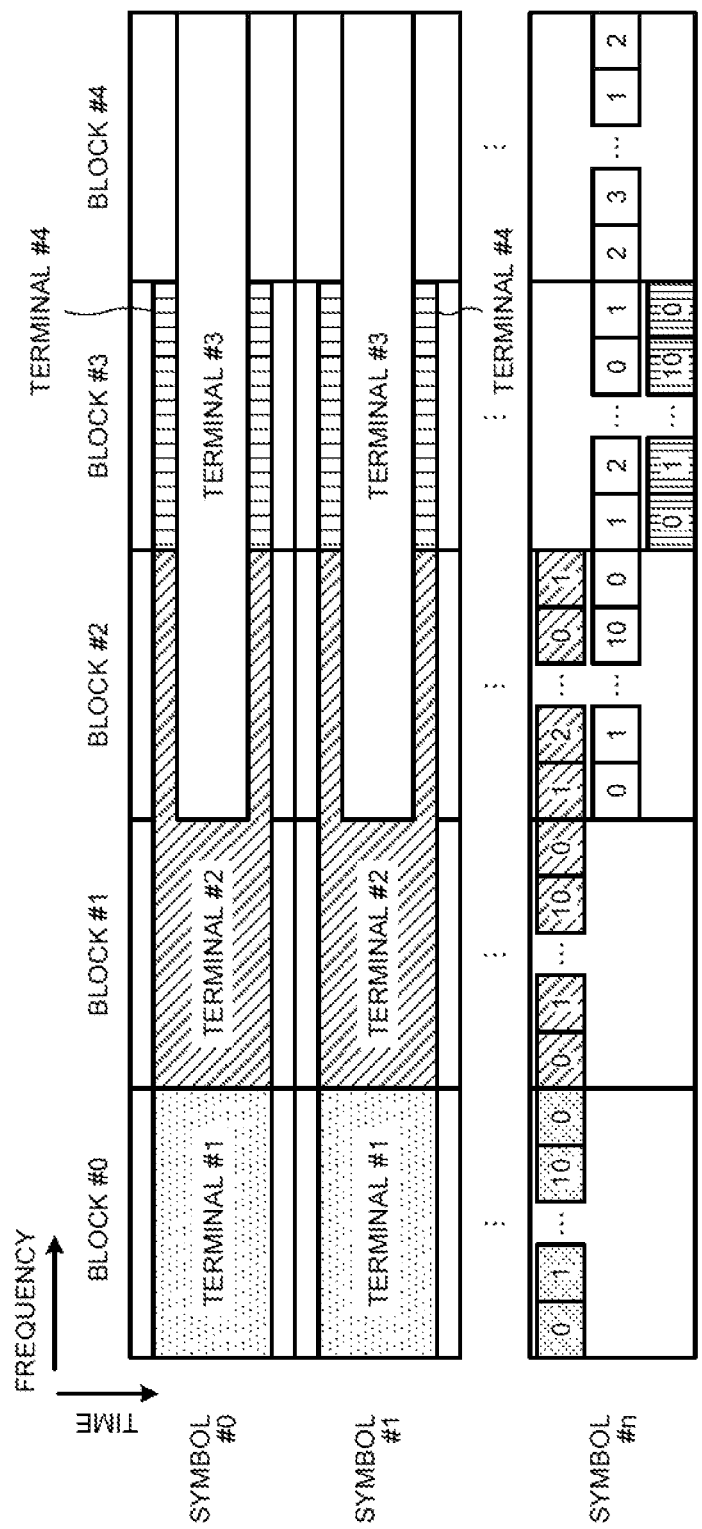
FIG. 7 is a diagram illustrating one example of a configuration of a received signal.

The following describes a specific example of detection of delimiting positions of terminal data with reference to FIG. 7. FIG. 7 is a diagram illustrating one example of a configuration of a received signal.

The received signal depicted in FIG. 7 includes five blocks of blocks #0 to #4, and these blocks contain pieces of transmission data from four radio terminal devices 100 of terminals #1 to #4. Specifically, the terminal #1 uses the block #0 to transmit transmission data, the terminal #2 uses the blocks #1 and #2 to transmit transmission data, the terminal #3 uses the blocks #2 to #4 to transmit transmission data, and the terminal #4 uses the block #3 to transmit transmission data.

The respective terminals #1 to #4 also transmit position indicating signals, using the blocks with which the terminals transmit transmission data. Specifically, the respective terminals #1 to #4 map pieces of transmission data to the symbols #0 to 190 (n-1) of each block, and also map position indicating signals to the symbol #n of the same each block. All of the terminals #1 to #4 cyclically extend the same signal sequence to generate position indicating signals.

The base station device 200 initially sets the block #0 as the first block, and detects correlation with the initial replica. In the block #0, terminal data of the terminal #1 starts, and thus the correlation value between the position indicating signal in the block #0 and the initial replica is equal to or larger than the predetermined threshold. Accordingly, the replica and the target block are shifted, and the correlation between the position indicating signal in the block #1 and the replica is detected. In the block #1, terminal data of the terminal #2 is contained but the terminal data of the terminal #1 is not contained, and thus the correlation value between the position indicating signal in the block #1 and the replica the starting point of which has been shifted is not equal to or larger than the predetermined threshold. Thus, it is determined that the terminal data of the terminal #1 is contained only in the block #0.

Subsequently, the base station device 200 sets the block #1 as the first block, and detects correlation with the initial replica. In the block #1, the terminal data of the terminal #2 starts, and thus the correlation value between the position indicating signal in the block #1 and the initial replica is equal to or larger than the predetermined threshold. Accordingly, the replica and the target block are shifted, and the correlation between the position indicating signal in the block #2 and the replica is detected. In the block #2, the terminal data of the terminal #2 continues to be contained, and thus the correlation value between the position indicating signal in the block #2 and the replica the starting point of which has been shifted is also equal to or larger than the predetermined threshold. Thus, it is determined that the terminal data of the terminal #2 is contained also in the block #2.

Subsequently, the replica and the target block are further shifted, and the correlation between the position indicating signal in the block #3 and the replica is detected. In the block #3, pieces of terminal data of the terminals #3 and #4 are contained, but the terminal data of the terminal #2 is not contained, and thus the correlation value between the position indicating signal in the block #3 and the replica the starting point of which has been shifted is not equal to or larger than the predetermined threshold. Thus, it is determined that the terminal data of the terminal #2 is contained in the blocks #1 and #2.

In the same manner, while successively setting the blocks #2 to #4 as the first block and shifting the starting point of the replica, the base station device 200 detects the correlation between the position indicating signal in each block and the replica. Consequently, it is determined that terminal data of the terminal #3 is contained in the blocks #2 to #4, and terminal data of the terminal #4 is contained only in the block #3.

In the blocks #2 and #3, pieces of terminal data of a plurality of radio terminal devices 100 collide with each other. However, because position indicating signals are generated by using a signal sequence such as a Zadoff-Chu sequence, if the beginnings of the pieces of terminal data do not match, the position indicating signals of the respective radio terminal devices 100 are orthogonal to each other, which enables accurate correlation detection. Demodulation of the pieces of terminal data in the blocks #2 and #3 where collision occurs may be stopped, and pieces of terminal data of the respective radio terminal devices 100 may be separated by a canceller. Specifically, for example, in the example depicted in FIG. 7, by using a channel estimation value of the terminal #2 in the block #1, the terminal data of the terminal #2 in the block #2 is demodulated. Subsequently, the terminal data of the terminal #3 may be obtained by cancelling the terminal data of the terminal #2 from the data in the block #2.

As described above, according to the present embodiment, each radio terminal device generates position indicating signals by cyclically extending a signal sequence having a sequence length smaller than the size of each of blocks in radio resources, and maps the position indicating signals together with data to the blocks to transmit them. The base station device generates replicas of the position indicating signals, and detects correlation with the position indicating signal in each block included in received signals while shifting the starting point of each replica. Thus, by determining whether the correlation between the replica and the position indicating signal is high, whether consecutive pieces of terminal data transmitted from the same radio terminal device are contained in the corresponding blocks can be determined. Consequently, delimiting positions of pieces of data transmitted from the respective radio terminal devices can be efficiently detected.

In the first embodiment described above, as a signal sequence for generating position indicating signals, for example, a Zadoff-Chu sequence is used. The sequence length of the Zadoff-Chu sequence used herein is equal to or smaller than the size of each block in the radio resources, and position indicating signals can be set orthogonal to each other among blocks the number of which is equal to the sequence length. Specifically, for example, when a Zadoff-Chu sequence the sequence length of which is 11 is cyclically extended to generate position indicating signals, 11 types of position indicating signals the cyclic shifts of which are different can be generated, and the position indicating signals orthogonal to each other can be mapped to 11 blocks.

Figure 8:
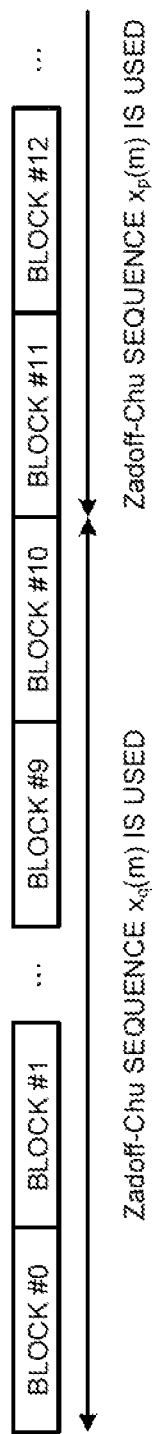
FIG. 8 is a diagram illustrating a specific example of a position indicating signal.

However, when the size of data transmitted from each radio terminal device 100 is large and the transmission data is mapped to 12 or more blocks, a plurality of blocks containing the same position indicating signal are generated, and thus continuity of blocks are not accurately evaluated. In such a case, a Zadoff-Chu sequence the sequence type of which is different may be used for the 12th and subsequent blocks. Specifically, for example, as depicted in FIG. 8, a first Zadoff-Chu sequence $x_q(m)$ the sequence length of which is 11 may be used to generate position indicating signals for 11 blocks of the blocks #0 to #10, and a second Zadoff-Chu sequence $x_p(m)$ the sequence length of which is 11 may be used to generate position indicating signals for 11 blocks of the subsequent blocks #11 to #21. In this manner, by changing the sequence type used to generate position indicating signals for every certain number of blocks the number of which is equal to the sequence length, position indicating signals among all consecutive blocks can be distinguished, and thus the continuity of blocks can be accurately evaluated.

Figure 9:
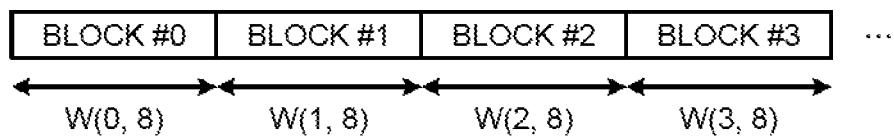
FIG. 9 is a diagram illustrating another specific example of the position indicating signal.

The signal sequence used to generate position indicating signals is not limited to the Zadoff-Chu sequence. Specifically, for example, a Walsh-code that is an orthogonal code may be used to generate position indicating signals. The upper diagram in FIG. 9 is a diagram illustrating one example of a Walsh-code the sequence length of which is eight. As depicted in this diagram, when the sequence length is eight, eight codes orthogonal to each other can be generated, and thus these codes may be used as position indicating signals for respective blocks. Specifically, for example, as depicted in the lower diagram in FIG. 9, the first code W(0, 8) is assigned to the first block #0, the second code W(1, 8) is assigned to the second block #1, and in this manner, regularity of the code for each block is determined in advance. By this assignment, even when the Walsh-code is used for the position indicating signals, continuity of blocks can be evaluated, and delimiting positions of terminal data for each radio terminal device 100 can be detected.

[b] Second Embodiment

A second embodiment is characterized in that codes and position indicating signals are associated with each other when a radio terminal device code-multiplexes transmission data.

In the first embodiment described above, a plurality of radio terminal devices 100 use the same signal sequence to generate position indicating signals, and use uplink contention-based access to transmit pieces of data and the position indicating signals. Thus, when the radio terminal devices 100 transmit the pieces of data using the same radio resource for the beginnings of the pieces of data, the same position indicating signals transmitted from the radio terminal devices 100 will be contained in the same one block, which makes it difficult to detect delimiting positions of terminal data of each radio terminal device 100.

In view of this, in the second embodiment, each radio terminal device 100 spreads transmission data with codes, and associates the respective codes with different position indicating signals. By this processing, pieces of transmission data of the radio terminal devices 100 are code-multiplexed, whereby data of each radio terminal device 100 can be demodulated, and also delimiting positions of terminal data can be accurately detected with the position indicating signal for each code.

Figure 10:
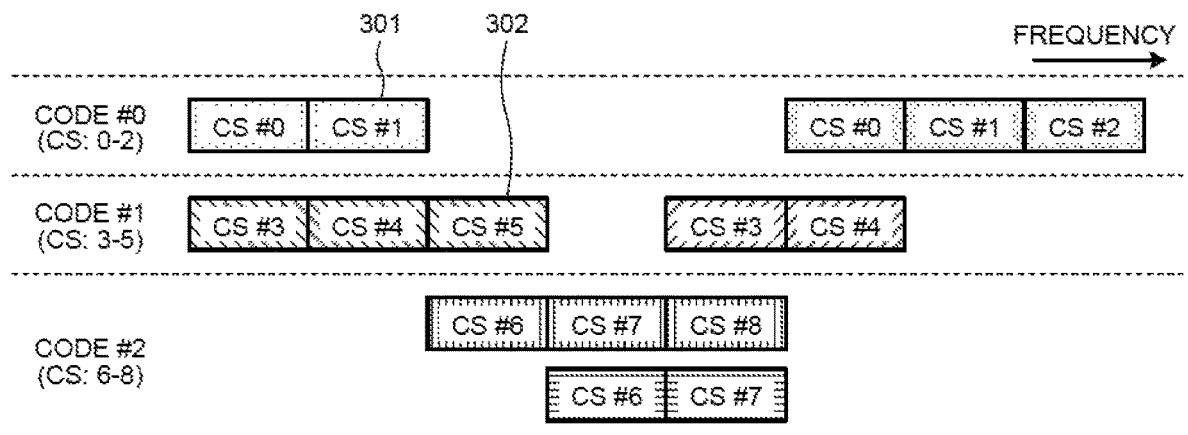
FIG. 10 is a diagram illustrating a specific example of relation between codes and cyclic shifts.

Specifically, for example, by assigning position indicating signals having cyclic shifts that are different between codes, the position indicating signals having different cyclic shifts are mapped to blocks to which pieces of data spread with different codes are mapped. FIG. 10 is a diagram illustrating a specific example of relation between codes and cyclic shifts of position indicating signals.

As depicted in FIG. 10, three types of cyclic shift (CS) amounts are assigned to the respective codes, and, for example, to blocks to which pieces of data spread with the code #0 are mapped, position indicating signals the cyclic shifts of which are 0 to 2 are assigned. Specifically, to the blocks to which pieces of data spread with the code #0 have been mapped, for example, position indicating signals obtained by cyclically extending a signal sequence such as a Zadoff-Chu sequence using, as a starting point, a position that is shifted within a range of 0 to 2 from the beginning are mapped. Thus, for example, two blocks are included in the transmitted signal 301 from a certain radio terminal device 100, and to these blocks, a position indicating signal CS#0 the cyclic shift of which is 0 and a position indicating signal CS#1 the cyclic shift of which is 1 are each mapped.

In the same manner, three blocks are included in the transmitted signal 302 data of which has been spread with the code #1, and to these blocks, the position indicating signals CS#3 to CS#5 the cyclic shifts of which are 3 to 5, respectively, are each mapped.

Because position indicating signals having cyclic shifts that are different between codes are assigned in this manner, even when a plurality of radio terminal devices 100 transmit pieces of data using the same radio resource at the beginnings thereof, delimiting positions of the respective pieces of terminal data can be detected if their codes are different. Specifically, the transmitted signals 301 and 302 depicted in FIG. 10 use the same radio resource at their beginnings, but their codes with which pieces of data are spread are different, and thus the cyclic shifts of the position indicating signals are different. Thus, the base station device 200 can distinguish the position indicating signals of the signals 301 and 302, thereby detecting delimiting positions of the respective pieces of terminal data.

In FIG. 10, although blocks containing pieces of data that have been spread with the code #2 by a plurality of radio terminal devices 100 overlap, blocks from which the pieces of data start are different, the cyclic shifts are accordingly different, and thus delimiting positions for each radio terminal device 100 can be accurately detected in the same manner as in the first embodiment.

In the example depicted in FIG. 10, three types of cyclic shifts are each assigned to the respective codes. However, there are various types of data transmitted from each radio terminal device 100, and the sizes thereof are different. In view of this, by changing the width of a cyclic shift to be assigned for each code, data in various sizes from a small size to a large size may be allowed to be transmitted.

Figure 11:
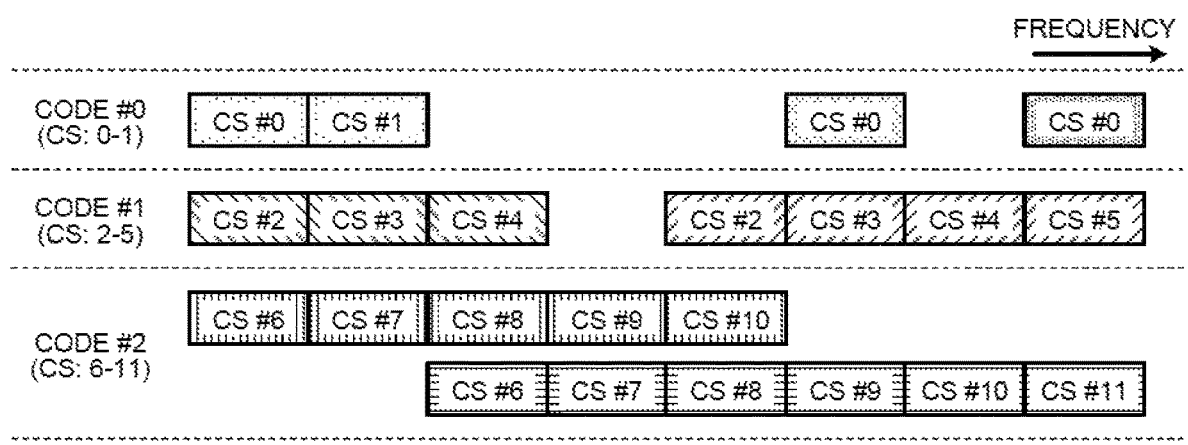
FIG. 11 is a diagram illustrating another specific example of the relation between the codes and cyclic shifts.

Specifically, for example, by assigning position indicating signals the widths of cyclic shifts of which are different between codes, the number of blocks that can be consecutively transmitted is made different between the codes. FIG. 11 is a diagram illustrating a specific example of relation between codes and the cyclic shifts of position indicating signals.

As depicted in FIG. 11, cyclic shifts having different widths are assigned to the respective codes and, for example, to blocks to which pieces of data spread with the code #0 are mapped, position indicating signals the cyclic shifts of which are 0 to 1 are assigned. Specifically, to the blocks to which pieces of data spread with the code #0 have been mapped, position indicating signals obtained by cyclically extending the original signal sequence using, as a starting point, a position that is shifted within a range of 0 to 1 from the beginning are mapped. Meanwhile, to the blocks to which pieces of data spread with the code #1 have been mapped, position indicating signals obtained by cyclically extending the original signal sequence using, as a starting point, a position that is shifted within a range of 2 to 5 from the beginning are mapped.

Because the widths of cyclic shifts assigned to the respective codes are different as described above, data having a size of two blocks at the maximum can be transmitted with the code #0, while data having a size of four blocks at the maximum can be transmitted with the code #1. Furthermore, because a cyclic shift of 6 to 11 is assigned to the code #2, data having a size of six blocks at the maximum can be transmitted with the code #2.

When a signal sequence such as a Zadoff-Chu sequence is used in generating position indicating signals, by using signal sequences in a plurality of sequence types, the number of combinations of the sequence types and the cyclic shifts is increased, whereby position indicating signals in more blocks can be distinguished.

Figure 12:
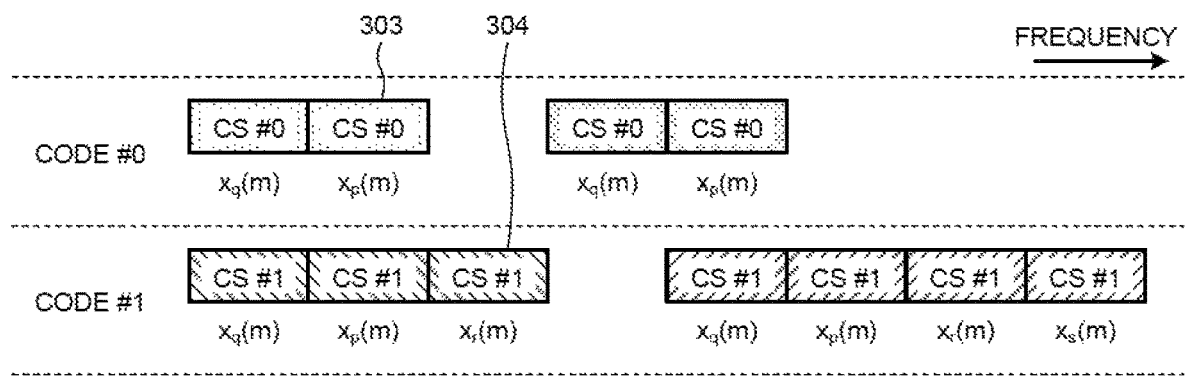
FIG. 12 is a diagram illustrating a specific example of relation between codes and signal sequences.

Specifically, for example, as depicted in FIG. 12, by assigning cyclic shifts in one type for each code, position indicating signals based on signal sequences that are different between blocks in the frequency direction are mapped. Specifically, for example, the position indicating signal CS#0 the cyclic shift of which is 0 is mapped to blocks to which pieces of data spread with the code #0 have been mapped, and the position indicating signal CS#1 the cyclic shift of which is 1 is mapped to blocks to which pieces of data spread with the code #1 have been mapped.

Herein, a signal sequence used in generating a position indicating signal is different between blocks and, for example, a position indicating signal based on the signal sequence $x_q(m)$ is mapped to the first block of the transmitted signal 303, and a position indicating signal based on the signal sequence $x_p(m)$ is mapped to the second block thereof. In the same manner, for example, the position indicating signal based on the signal sequence $x_q(m)$ is mapped to the first block of the transmitted signal 304, the position indicating signal based on the signal sequence $x_p(m)$ is mapped to the second block thereof, and a position indicating signal based on the signal sequence $x_r(m)$ is mapped to the third block thereof.

As described above, the cyclic shift differs in the code direction, and the sequence type of a signal sequence differs between blocks in the frequency direction. Thus, the base station device 200 distinguishes position indicating signals of each radio terminal device 100 on the basis of the cyclic shifts, and also evaluates the continuity of blocks on the basis of the sequence types. Consequently, delimiting positions of terminal data of each radio terminal device 100 can be detected.

Figure 13:
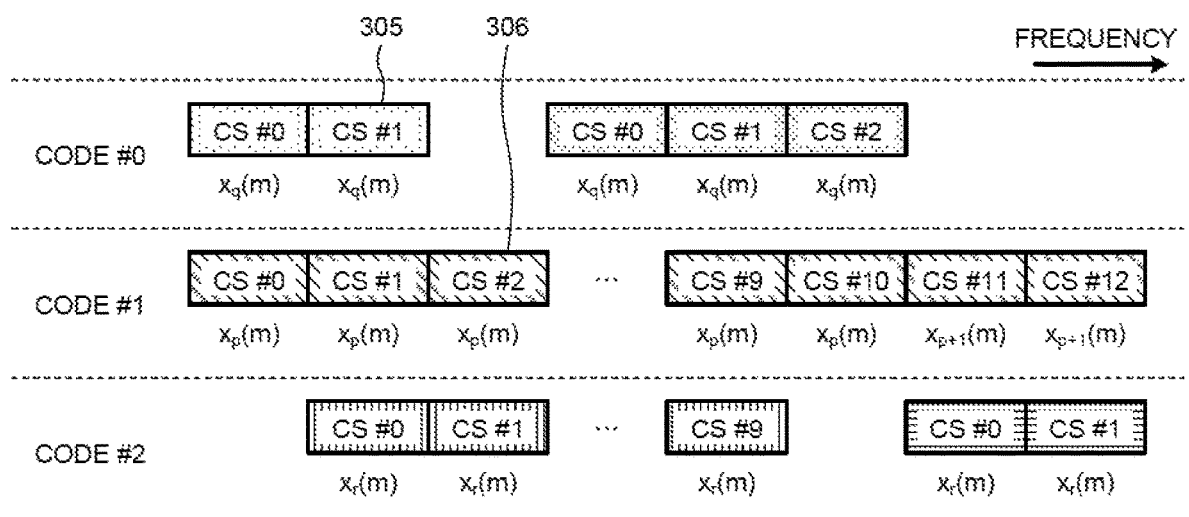
FIG. 13 is a diagram illustrating another specific example of relation between codes and signal sequences.

Furthermore, in the example depicted in FIG. 12, distinguishable items can be changed between the code direction and the frequency direction. Specifically, for example, as depicted in FIG. 13, a sequence type in one type is assigned for each code, and position indicating signals the cyclic shifts of which differ between blocks in the frequency direction are mapped. Specifically, for example, position indicating signals based on the signal sequence $x_q(m)$ are mapped to blocks to which pieces of data spread with the code #0 have been mapped, and position indicating signals based on the signal sequence $x_p(m)$ are mapped to blocks to which pieces of data spread with the code #1 have been mapped.

Because the sequence type differs between codes in this manner, for example, even if the transmitted signals 305 and 306 use the same radio resource for the beginning thereof, position indicating signals of each radio terminal device 100 can be distinguished based on the difference of the sequence type. Herein, the transmitted signal 306 includes blocks the number of which is larger than the sequence length of the signal sequence $x_p(m)$, and thus the signal sequence $x_{p+1}(m)$ different from the signal sequence $x_p(m)$ is also used to generate position indicating signals.

When respective transmitted signals corresponding to one code are focused on, in the same manner as in the first embodiment, position indicating signals having different cyclic shifts are mapped to the respective blocks, and thus the continuity of blocks can be evaluated. As described above, the sequence type of a signal sequence differs in the code direction, and the cyclic shift differs in the frequency direction. Thus, the base station device 200 distinguishes position indicating signals of each radio terminal device 100 on the basis of the sequence types, and also evaluates the continuity of blocks on the basis of the cyclic shifts. Consequently, delimiting positions of terminal data of each radio terminal device 100 can be detected.

As described above, according to the present embodiment, position indicating signals having different cyclic shifts or different signal sequence are associated with the respective codes with which pieces of data are spread, and the associated position indicating signals are mapped to blocks to which the pieces of data have been spread with the respective codes. Thus, even when position indicating signals of a plurality of radio terminal devices are mapped to the same block, position indicating signals of each radio terminal device can be distinguished, whereby delimiting positions of the respective pieces of terminal data can be detected.

[c] Third Embodiment

A third embodiment is characterized in that position indicating signals having the same cyclic shift are distinguished by performing orthogonal coding on the position indicating signals.

In the first embodiment described above, a plurality of radio terminal devices 100 use the same signal sequence to generate position indicating signals, and use uplink contention-based access to transmit pieces of data and the position indicating signals. Thus, when the radio terminal devices 100 transmit pieces of data using the same radio resource for the beginnings of the pieces of data, the same position indicating signals transmitted from the radio terminal devices 100 will be contained in the same one block, which makes it difficult to detect delimiting positions of terminal data of each radio terminal device 100.

In view of this, in the third embodiment, each radio terminal device 100 spreads transmission data with codes, and associates the respective codes with different position indicating signals in the same manner as in the second embodiment. Furthermore, in the third embodiment, the radio terminal device 100 orthogonally codes position indicating signals with an orthogonal code such as an orthogonal cover code (OCC), thereby enabling position indicating signals having the same cyclic shift to be distinguished. By these processes, pieces of transmission data of the radio terminal devices 100 are code-multiplexed and also the position indicating signals are orthogonally coded, whereby the number of pieces of multiplexed data the delimiting positions of which can be detected for each radio terminal device 100 can be increased.

Figure 14:
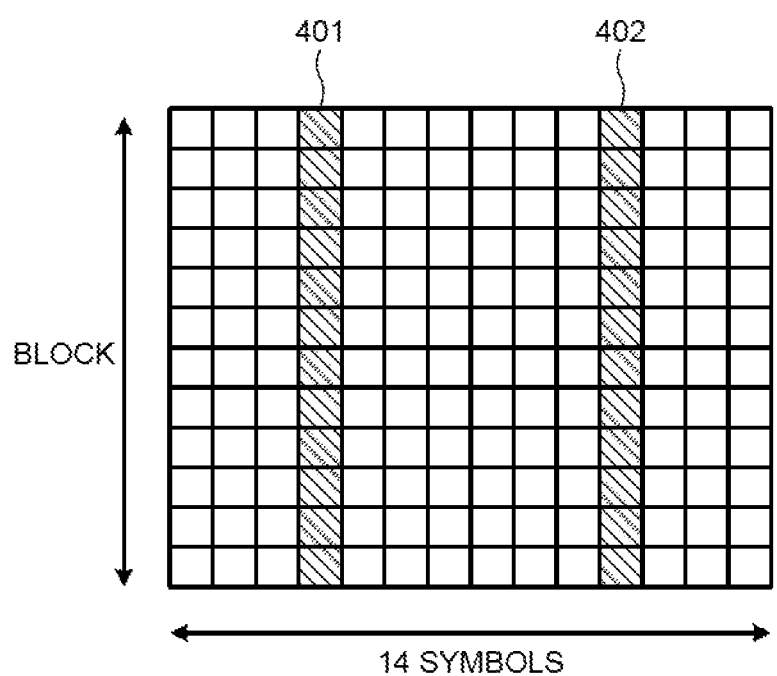
FIG. 14 is a diagram illustrating an orthogonal code.

FIG. 14 is a diagram for explaining one example of the orthogonal code. Blocks depicted in FIG. 14 contain 14 symbols in a time direction, for example, and the 4th symbol 401 and the 11th symbol 402 have position indicating signals. When an OCC that is an orthogonal code is applied, the symbols 401 and 402 having the position indicating signals are coded with an OCC [1, 1] or [1, −1]. Thus, for example, when the position indicating signals contained in the symbols 401 and 402 are position indicating signals the cyclic shift of which is 0, for example, these position indicating signals can be distinguished as two types of position indicating signals depending on whether they are coded with the OCC [1, 1] or coded with the OCC [1, −1].

The position indicating signals contained in the symbols 401 and 402 can be used also as reference signals such as demodulation reference signals (DMRS).

Figure 15:
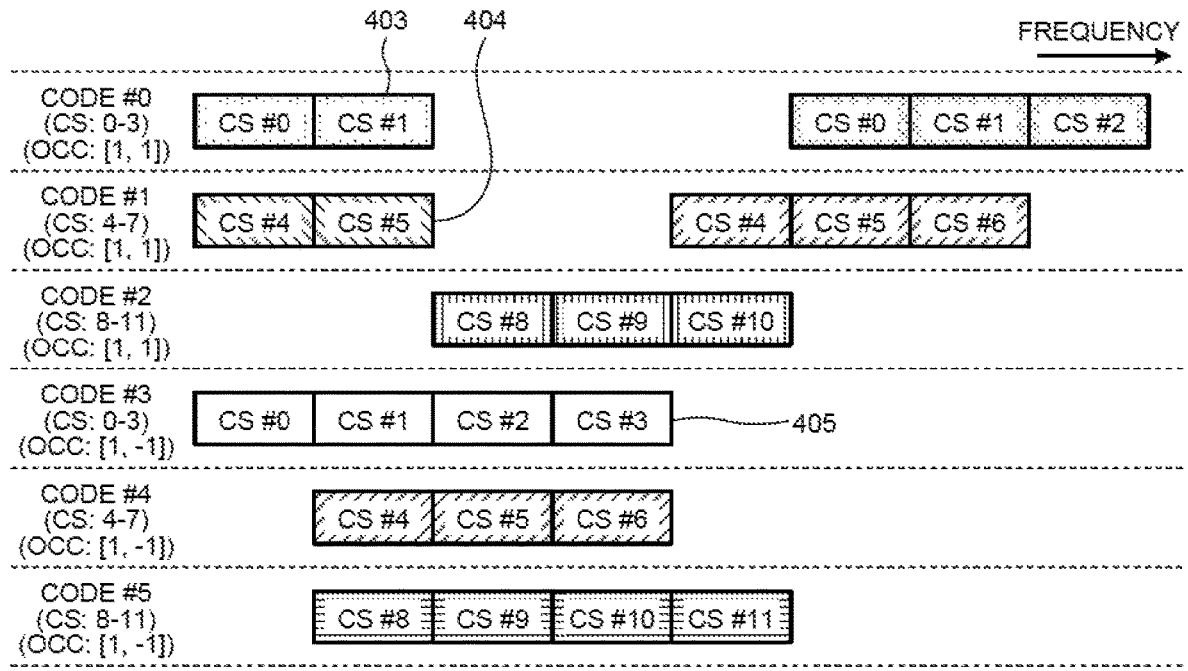
FIG. 15 is a diagram illustrating still another specific example of relation between codes and cyclic shifts.

FIG. 15 is a diagram illustrating a specific example of relation between codes and cyclic shifts when position indicating signals are orthogonally coded. As depicted in FIG. 15, four types of cyclic shifts are assigned to the respective codes. For example, to blocks to which pieces of data spread with the code #0 are mapped, position indicating signals the cyclic shifts of which are 0 to 3 are assigned. Thus, for example, two blocks are included in the transmitted signal 403 from a certain radio terminal device 100, and to these blocks, the position indicating signal CS#0 the cyclic shift of which is 0 and the position indicating signal CS#1 the cyclic shift of which is 1 are each mapped.

Similarly, two blocks are included in the transmitted signal 404 data of which has been spread with the code #1, and to these blocks, the position indicating signals CS#4 and #5 the cyclic shifts of which are 4 and 5 are each mapped.

Because position indicating signals having cyclic shifts that are different between codes are assigned in this manner, even when a plurality of radio terminal devices 100 transmit pieces of data using the same radio resource at the beginnings thereof, delimiting positions of the respective pieces of terminal data can be detected if their codes are different. Specifically, the transmitted signals 403 and 404 depicted in FIG. 15 use the same radio resource at their beginnings, but their codes with which pieces of data are spread are different, and thus the cyclic shifts of the position indicating signals are different. Thus, the base station device 200 can distinguish the position indicating signals of the signals 403 and 404, thereby detecting delimiting positions of the respective pieces of terminal data.

Furthermore, position indicating signals in blocks to which pieces of data spread with the codes #0 to #2 have been mapped are coded with the OCC [1, 1]. By contrast, position indicating signal in blocks to which pieces of data spread with the codes #3 to #5 have been mapped are coded with the OCC [1, −1]. Thus, for example, although the cyclic shifts of the position indicating signals assigned to the code #0 and the code #3 are both 0 to 3, the position indicating signals can be distinguished with the orthogonal codes applied to the position indicating signals.

Specifically, for example, the transmitted signal 403 pieces of data of which have been spread with the code #0 and the transmitted signal 405 pieces of data of which have been spread with the code #3 use the same radio resource at their beginnings, and the cyclic shifts of the position indicating signals in the first blocks are also the same. However, these transmitted signals 403 and 405 use different orthogonal codes for coding the position indicating signals, and thus the base station device 200 can distinguish the position indicating signals of the signals 403 and 405, thereby detecting delimiting positions of the respective pieces of terminal data.

As described above, according to the present embodiment, position indicating signals having different cyclic shifts are associated with the respective codes with which pieces of data are spread, and for codes with which position indicating signals having the same cyclic shifts are associated, the position indicating signals are orthogonally coded. Thus, even when position indicating signals of a plurality of radio terminal devices are mapped to the same block, position indicating signals of each radio terminal device can be distinguished, whereby delimiting positions of the respective pieces of terminal data can be detected.

In the respective embodiments described above, the cyclic shifts of position indicating signals in adjacent blocks are serial numbers, and the cyclic shifts of position indicating signals associated with different codes are also serial numbers. However, these cyclic shifts do not necessarily have to be serial numbers.

Figure 16:
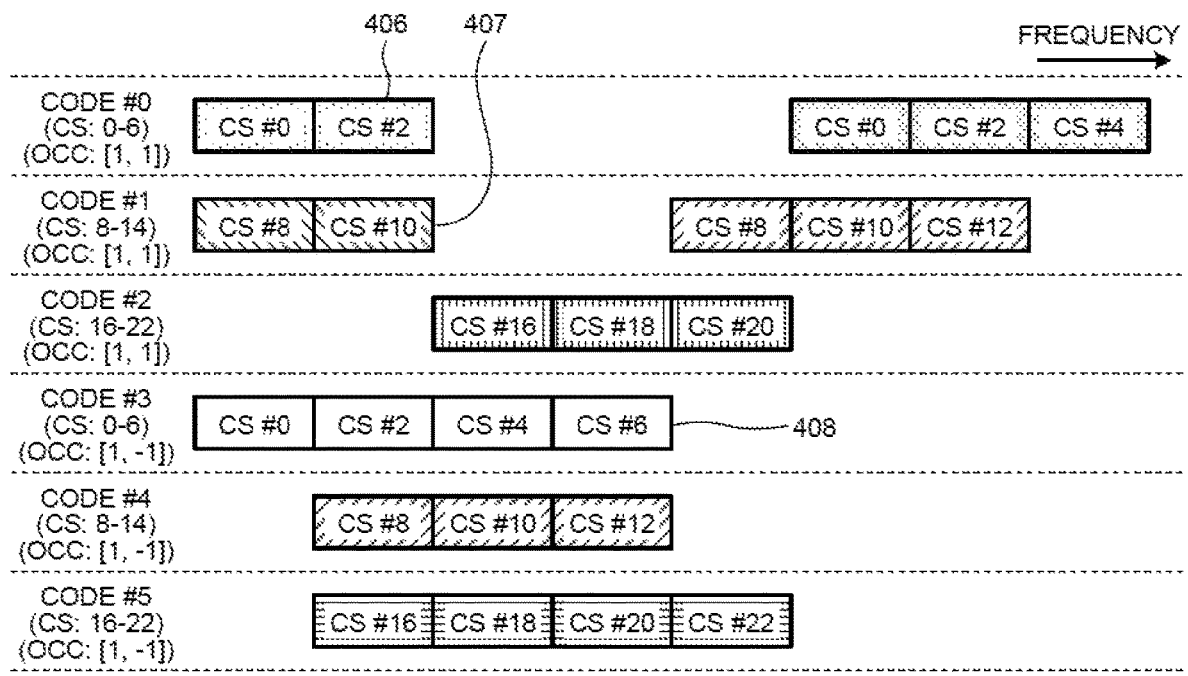
FIG. 16 is a diagram illustrating still another specific example of relation between codes and cyclic shifts.

Specifically, for example, as depicted in FIG. 16, position indicating signals the cyclic shifts of which are even numbers only can also be used. In FIG. 16, although cyclic shifts of 0 to 6 are assigned to the code #0, the cyclic shifts of position indicating signals in the blocks adjacent in the transmitted signal 406 are 0 and 2. Similarly, although cyclic shifts of 8 to 14 are assigned to the code #1, the cyclic shifts of position indicating signals in the blocks adjacent in the transmitted signal 407 are 8 and 10. Furthermore, although cyclic shifts of 0 to 6, which are the same as for the code #0, are assigned to the code #3, the cyclic shifts of position indicating signals in the blocks adjacent in the transmitted signal 408 are 0, 2, 4, and 6.

As described above, the cyclic shifts of position indicating signals in adjacent blocks do not necessarily have to be serial numbers, and only need to be different from each other. By increasing differences of cyclic shifts between the adjacent blocks and between different codes, errors in demodulation and decoding of position indicating signals are reduced, whereby delimiting positions of terminal data of each radio terminal device 100 can be more accurately detected. Optimum differences of cyclic shifts can be calculated as follows, for example.

Specifically, when the sequence length of a signal sequence used in generating position indicating signals is denoted by L, the maximum number of radio terminal devices 100 to be multiplexed is denoted by N, and a value indicating whether OCC is applied is denoted by M, the difference $D_{intra}$ of cyclic shifts assigned to different codes are calculated by Formula (3):

$$D_{intra} = L/N * M \quad (3)$$

where the value of M is 2 when OCC is applied, and is 1 when OCC is not applied.

The difference $D_{inter}$ of cyclic shifts between adjacent blocks is calculated by Formula (4) below using the above-described difference $D_{intra}$.

$$D_{inter} = D_{intra}/(L/N) \quad (4)$$

By setting cyclic shifts the differences of which are calculated by these Formulae (3) and (4), smallest differences of cyclic shifts of position indicating signals can be maximized. Consequently, errors in demodulation and decoding of position indicating signals are reduced, whereby delimiting positions of terminal data of each radio terminal device 100 can be more accurately detected.

[d] Fourth Embodiment

A fourth embodiment is characterized in that position indicating signals associated with the same code are distinguished by cyclic shifts.

In the respective embodiments described above, position indicating signals having different cyclic shifts are associated with the respective codes. However, if the cyclic shifts of position indicating signals are different, the radio terminal devices 100 that transmit signals can be distinguished even when using the same code.

In the fourth embodiment, when each radio terminal device 100 spreads data with a code, the code is selected and also the cyclic shifts of position indicating signals are selected. Specifically, when transmitting data using uplink contention-based access, the radio terminal device 100 selects a code with which data is spread, and also selects a group of cyclic shifts applied to the position indicating signals from groups of cyclic shifts determined in advance.

Figure 17:
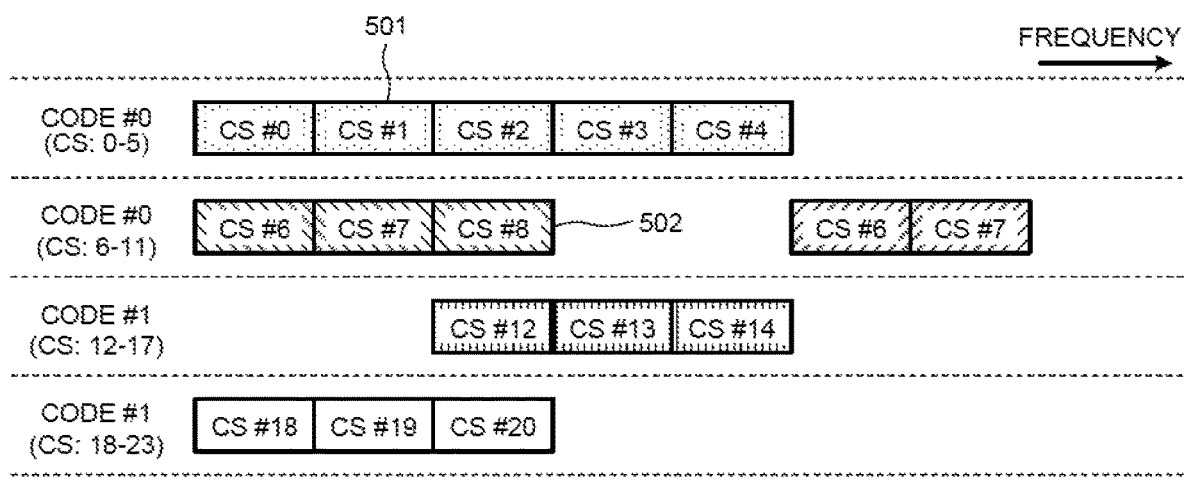
FIG. 17 is a diagram for explaining association between codes and groups of cyclic shifts.

More specifically, for example, as depicted in FIG. 17, a group of cyclic shifts of 0 to 5 and a group of cyclic shifts of 6 to 11 are associated with the code #0, and a group of cyclic shifts of 12 to 17 and a group of cyclic shifts of 18 to 23 are associated with the code #1. Thus, a certain radio terminal device 100 selects the code #0 and also selects the group of cyclic shifts of 0 to 5, for example, to transmit the transmitted signal 501. Another radio terminal device 100 selects the code #0 and also selects the group of cyclic shifts of 6 to 11, for example, to transmit the transmitted signal 502.

Pieces of data of these transmitted signals 501 and 502 are spread both with the code #0, but the groups of cyclic shifts thereof are different. Thus, although the transmitted signals 501 and 502 use the same radio resource at their beginnings, the cyclic shift of the first block of the transmitted signal 501 is 0 while the cyclic shift of the first block of the transmitted signal 502 is 6. Consequently, the base station device 200 that receives the transmitted signals 501 and 502 can distinguish the radio terminal devices 100 that are sources of these signals, and can accurately detect delimiting positions of transmission data of each radio terminal device 100.

Figure 18:
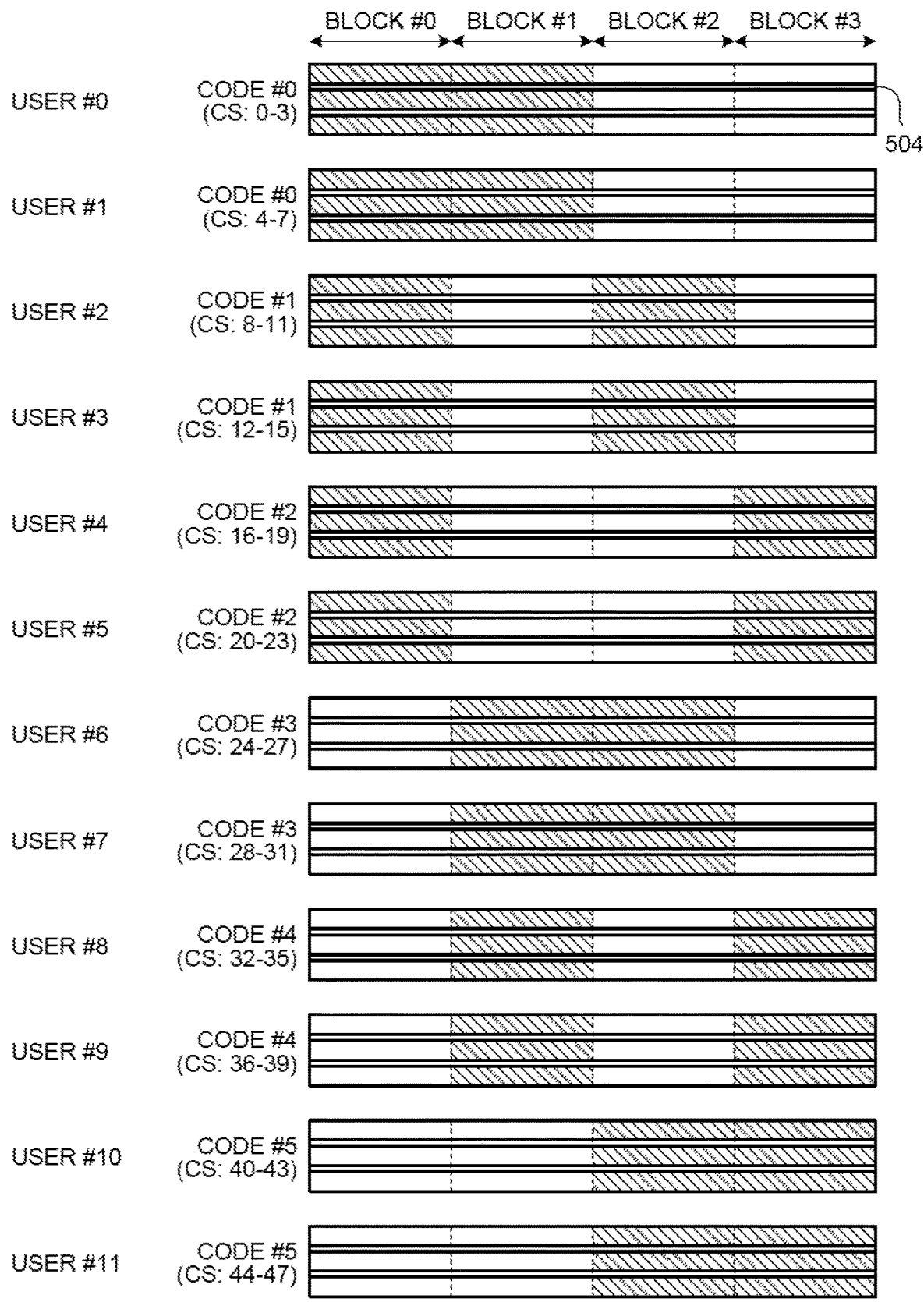
FIG. 18 is a diagram illustrating a specific example of codes and cyclic shifts for respective users.

A specific example in which a plurality of groups of cyclic shifts are associated with the same code as described above is illustrated in FIG. 18. FIG. 18 is a diagram illustrating transmitted signals transmitted from 12 radio terminal devices 100 of users #0 to #11.

Each transmitted signal includes blocks #0 to #3, and includes data spread with either one of codes #0 to #5. Herein, being spread with the codes #0 to #5, pieces of data are mapped only to any two hatched blocks among four blocks of the blocks #0 to #3. Specifically, for example, pieces of data spread with the code #0 are mapped to the blocks #0 and #1, and pieces of data spread with the code #1 are mapped to the blocks #0 and #2.

While pieces of data are mapped to only two blocks among four blocks, position indicating signals 504 are mapped to all four blocks. With each code, two groups of different cyclic shifts of the position indicating signals 504 are associated. Thus, for example, pieces of data of the users #0 and #1 are both spread with the code #0 to be arranged only in the blocks #0 and #1, but can be distinguished by the cyclic shifts of the position indicating signals 504.

Information on associated relation between codes and cyclic shifts may be reported, if needed, to each radio terminal device 100 by report information transmitted from the base station device 200, or the radio terminal device 100 may be notified of the information by the base station device 200 at the time of call connection. Information transmitted from the base station device 200 may be table information indicating the associated relation between codes and cyclic shifts itself, or may be information for the radio terminal device 100 to perform computation using Formulae (3) and (4) above.

As described above, according to the present embodiment, position indicating signals having different groups of cyclic shifts are associated with the respective codes with which pieces of data are spread. Thus, position indicating signals of a plurality of radio terminal devices that transmit pieces of data spread with the same code can be distinguished by the cyclic shifts, whereby delimiting positions of the respective pieces of terminal data can be detected. Furthermore, with a smaller number of codes, pieces of terminal data of more radio terminal devices can be multiplexed.

According to one aspect of a radio communication method, a radio terminal device, a base station device, and a radio communication system disclosed by the present application, an effect of being able to efficiently detect the delimiting position of data transmitted from each of a plurality of radio terminal devices can be obtained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication method used in a radio communication system including a radio terminal device and a base station device, the method comprising:
　by the radio terminal device,
　　generating indicating signals that are different between blocks of radio resources each of which is an allocation unit of data and includes a plurality of symbols;
　　mapping the indicating signals generated and transmission data to the blocks such that one of the indicating signals and the transmission data are mapped to different symbols in one block; and
　　transmitting a signal including the blocks;
　by the base station device,
　　receiving the signal including the blocks of the radio resources;
　　evaluating continuity of the blocks, based on the indicating signals mapped to the blocks; and
　　demodulating data mapped to the blocks for each radio terminal device, based on an evaluation result.

2. The radio communication method according to claim 1, wherein the generating includes generating the indicating signals by cyclically extending a signal sequence having a sequence length that is equal to or smaller than size of each block from a starting point that is different for each block.

3. The radio communication method according to claim 2, wherein the generating includes generating, when size of the transmission data corresponds to blocks the number of which is equal to or larger than a predetermined number, the indicating signals by cyclically extending a plurality of different signal sequences.

4. The radio communication method according to claim 2, wherein the evaluating includes:
　generating a replica of an indicating signal for each block, based on the signal sequence; and
　detecting correlation between the replica generated and the blocks included in the signal received.

5. The radio communication method according to claim 2, wherein the generating includes generating, when a plural pieces of transmission data for a plurality of radio terminal devices are code-multiplexed, the indicating signals by cyclically extending a signal sequence from the starting point that is different and corresponds to each of a plurality of codes.

6. The radio communication method according to claim 1, wherein the generating includes orthogonally coding the indicating signals generated.

7. The radio communication method according to claim 2, wherein the generating includes setting the starting point that is different for each block, based on the sequence length of the signal sequence, a maximum number of a plural pieces of transmission data multiplexed to the blocks, and presence of orthogonal coding of the indicating signals.

8. A radio terminal device comprising:
a processor configured to execute a process including
generating indicating signals that are different between blocks of radio resources each of which is an allocation unit of data and includes a plurality of symbols, and
mapping the indicating signals generated and transmission data to the blocks such that one of the indicating signals and the transmission data are mapped to different symbols in one block; and
a transmission circuit configured to transmit a signal including the blocks.

9. A base station device comprising:
a reception circuit configured to receive a signal including a plurality of blocks of radio resources each of which is an allocation unit of data and includes a plurality of symbols;
a processor configured to execute a process including
evaluating continuity of the blocks, based on indicating signals mapped to the blocks such that one of the indicating signals and data are mapped to different symbols in one block and having predetermined regularity between consecutive blocks transmitted from a same transmission source, and
demodulating the data mapped to the blocks for each transmission source, based on a result of evaluation at the evaluating.

* * * * *

UNITED STATES PATENT AND TRADEMARK OFFICE
CERTIFICATE OF CORRECTION

PATENT NO. : 10,880,142 B2  
APPLICATION NO. : 16/256458  
DATED : December 29, 2020  
INVENTOR(S) : Masatsugu Shimizu et al.

Page 1 of 1

It is certified that error appears in the above-identified patent and that said Letters Patent is hereby corrected as shown below:

On the Title Page

Item (30), "(WO)" replaced with "(JP)" in "Foreign Application Priority Data"

Signed and Sealed this
Twenty-fourth Day of September, 2024

Katherine Kelly Vidal
*Director of the United States Patent and Trademark Office*